(12) United States Patent
Weichbold et al.

(10) Patent No.: US 7,993,240 B2
(45) Date of Patent: Aug. 9, 2011

(54) VARIABLE RATIO GEAR

(75) Inventors: Peter Weichbold, Klagenfurt (AT); Robert Tratnig, St. Margareten (AT)

(73) Assignee: AMSC Windtec GmbH, Klagenfurt (AT)

( * ) Notice: Subject to any disclaimer, the term of this patent is extended or adjusted under 35 U.S.C. 154(b) by 0 days.

(21) Appl. No.: 12/527,304

(22) PCT Filed: Jan. 29, 2009

(86) PCT No.: PCT/EP2009/051011
§ 371 (c)(1), (2), (4) Date: Oct. 15, 2009

(87) PCT Pub. No.: WO2009/132866
PCT Pub. Date: Nov. 5, 2009

(65) Prior Publication Data
US 2010/0137092 A1    Jun. 3, 2010

(30) Foreign Application Priority Data
Mar. 31, 2008   (EP) .................................. 08450047

(51) Int. Cl.
F16D 48/06   (2006.01)
(52) U.S. Cl. .......................................... 477/73; 477/207

(58) Field of Classification Search .................... 475/73, 475/77
See application file for complete search history.

(56) References Cited

U.S. PATENT DOCUMENTS
2003/0008745 A1*  1/2003  Heindl ............................ 475/83
2005/0194787 A1*  9/2005  Tilscher et al. ................... 290/8

FOREIGN PATENT DOCUMENTS
| EP | 1631758 | 5/2008 |
| WO | WO 81/01444 | 5/1981 |
| WO | WO 2004/088132 | 10/2004 |
| WO | WO 2004/109157 A1 | 12/2004 |
| WO | WO 2005/121550 | 12/2005 |
| WO | WO 2008/061263 A2 | 5/2008 |
| WO | WO 2008/149109 | 12/2008 |

* cited by examiner

*Primary Examiner* — Justin Holmes
(74) *Attorney, Agent, or Firm* — Occhiuti Rohlicek & Tsao LLP

(57) ABSTRACT

A variable ratio gear system is configured for use with a constant speed generator being driven by a variable speed rotor. The variable ratio system includes three shafts: The first shaft is mechanically coupled to the rotor; the second shaft is mechanically coupled to a variable gear system; and the third shaft is mechanically coupled to the generator and the variable gear system. A control system is configured to adjust the output of the variable gear system to control the rotational speed of the generator. A brake is configured to control the rotation of the second shaft.

24 Claims, 3 Drawing Sheets

VARIABLE RATIO GEAR

CROSS-REFERENCE TO RELATED APPLICATIONS

This application is the National Stage of International Application No. PCT/EP2009/051011, filed on Jan. 29, 2009, which claims the priority of European Patent Application No. 08450047.9, filed on Mar. 31, 2008. The contents of both applications are hereby incorporated by reference in their entirety.

BACKGROUND

This invention relates to a variable ratio gear system, in particular for use in a wind energy conversion system.

Wind energy can be converted into useful forms, such as electricity, by a wind energy converter that includes a rotor, e.g., a low speed propeller. The speed of the rotor is often influenced by local wind conditions and therefore fluctuates arbitrarily. Thus, conventional wind energy converters are typically operated with variable rotor speed and active torque control of the drive train to maintain a more constant generator rotational speed. The mass inertia of the rotor usually allows damping of the speed variations in the drive train, while the active torque control reduces the loads in the drive train and improves the quality of the electrical power fed to the grid. The active torque control also improves the aerodynamic efficiency during partially-loaded operational stage.

To supply electric power to the grid by converting wind energy, it is advantageous to use a constant speed generator (e.g., a synchronous generator directly connected to the grid for power transmission). In addition to economic benefits, the quality of the electric power fed into the grid is usually higher without a power converter, which can be expensive. Furthermore, the constant speed generator can be operated at a medium voltage level so that no additional transformer is needed.

Using a constant speed generator requires maintaining the input shaft to the generator at a constant speed while the input rotor speed changes over time. Therefore, a variable ratio gear is needed in the drive train. Previous approaches for providing a variable ratio gear include using a gear box consisting of combinations of epicyclic gears with a reaction path to control the variable speed ratio. In addition, hydrostatic circuits are used in the control path, since axial piston pumps of good efficiency are commercially available and provide the capability of damping high frequency torque oscillations in the drive train.

SUMMARY

In one aspect, in general, the invention features a variable ratio gear system configured for use with a constant speed generator being driven by a variable speed rotor. The variable ratio system includes three shafts: The first shaft is mechanically coupled to the rotor; the second shaft is mechanically coupled to a variable gear system; and the third shaft is mechanically coupled to the generator and the variable gear system. A control system is configured to adjust the output of the variable gear system to control the rotational speed of the generator. A brake is configured to control the rotation of the second shaft.

Embodiments may include one or more of the following features.

The variable ratio gear system further includes the variable gear system, which in some embodiments includes a hydraulic circuit. The hydraulic circuit may be a hydrostatic circuit, or alternatively, a hydrodynamic circuit. The hydraulic circuit includes a first hydraulic unit mechanically coupled to the second shaft, and a second hydraulic unit mechanically coupled to the third shaft. The first and second hydraulic units are interconnected by hydraulic conduits or by a pressure relief valve. The hydraulic conduits are interconnected by a dump valve.

The variable ratio gear system further includes a controller is configured to control the brake. The controller may receive a manual input for activating the brake or may receive sensor data for activating the brake.

The variable ratio gear system may further includes a gear box mechanically coupled between the first shaft and the rotor. The gear box includes a first and second epicyclic gear mechanically coupled to the first epicyclic gear. Each of the first and second epicyclic gears is configured to give a constant gear ratio. A spur gear is mechanically coupled between the gear box and the first shaft.

The variable ratio gear system may further include a spur gear mechanically coupled between the variable gear system and the second shaft, and/or a spur gear mechanically coupled between the variable gear system and the third shaft.

The control system may determine desired configurations of the first and second hydraulic units on the basis of a prescribed generator speed.

The hydraulic circuit provides hydraulic pressure. The control system may adjust the output of the variable gear system on the basis of the hydraulic pressure.

Among other advantages, the present invention provides a safety system for protecting the gear. During the operation of a variable ratio gear, unpredictable events may occur in the system, e.g., a hydraulic line bursts, or the control of the hydraulic units in the hydrostatic circuit is interrupted. Consequently, the ratio of the variable gear will no longer be properly controlled. In the case of a hydraulic break, the wind turbine is decoupled from the generator so energy can no longer be transmitted to the generator. The rotor usually stops within a few seconds by known means (e.g. emergency brake, aerodynamical deceleration). However, the generator will keep rotating much longer, possibly up to a few minutes, due to its low friction, high speed and high inertia. This will cause high rotational speeds of the mechanical components in the gear as well as in the hydraulic units and inevitably damage parts of the machine; in particular, hydraulic pumps which are not designed to withstand high overspeed.

Other features and advantages of the invention are apparent from the following description, and from the claims.

DETAILED DESCRIPTION

Figure 1A:
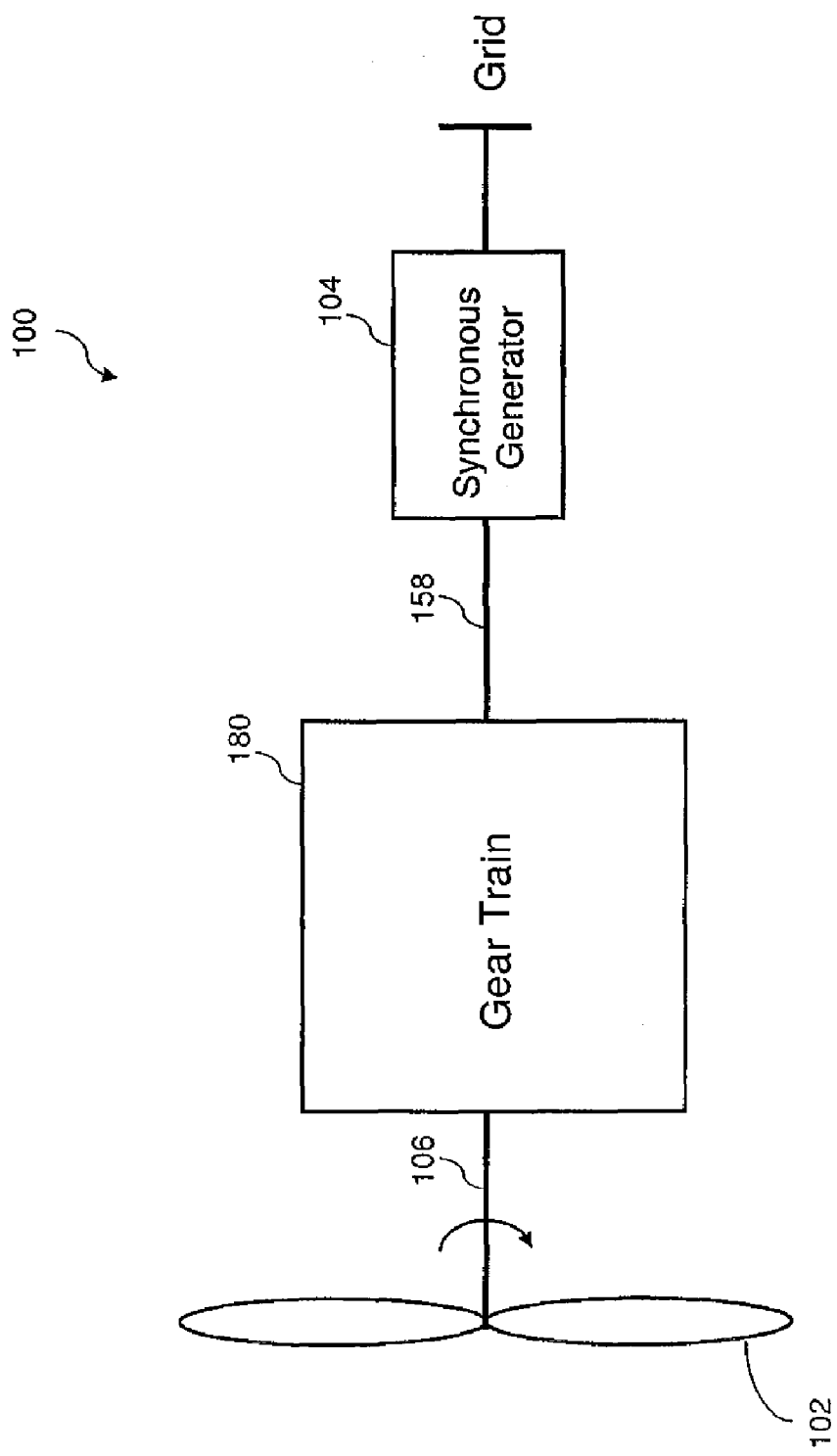
FIGS. 1A and 1B are schematic illustrations of a variable ratio gear system for a wind energy converter.

Referring to FIG. 1A, a drive train 100 for a wind energy converter includes a rotor 102 (e.g., a low speed propeller) that drives a generator 104 (preferably, a constant speed synchronous generator) through a gear train 180. The speed of the rotor 102 is generally influenced by local wind conditions and therefore fluctuates arbitrarily. The gear train 180 receives this varying rotor speed through an input shaft 106. Using active torque control, the gear train 180 can drive an output shaft 158 and thus the synchronous generator 104 at a constant rotational speed. The synchronous generator 104 provides high-quality electric power that can be directly transmitted to the grid without a converter.

Generally, there are many embodiments of gear configuration in the drive train 180. For the purpose of illustration, one embodiment is described in detail below.

Figure 1B:
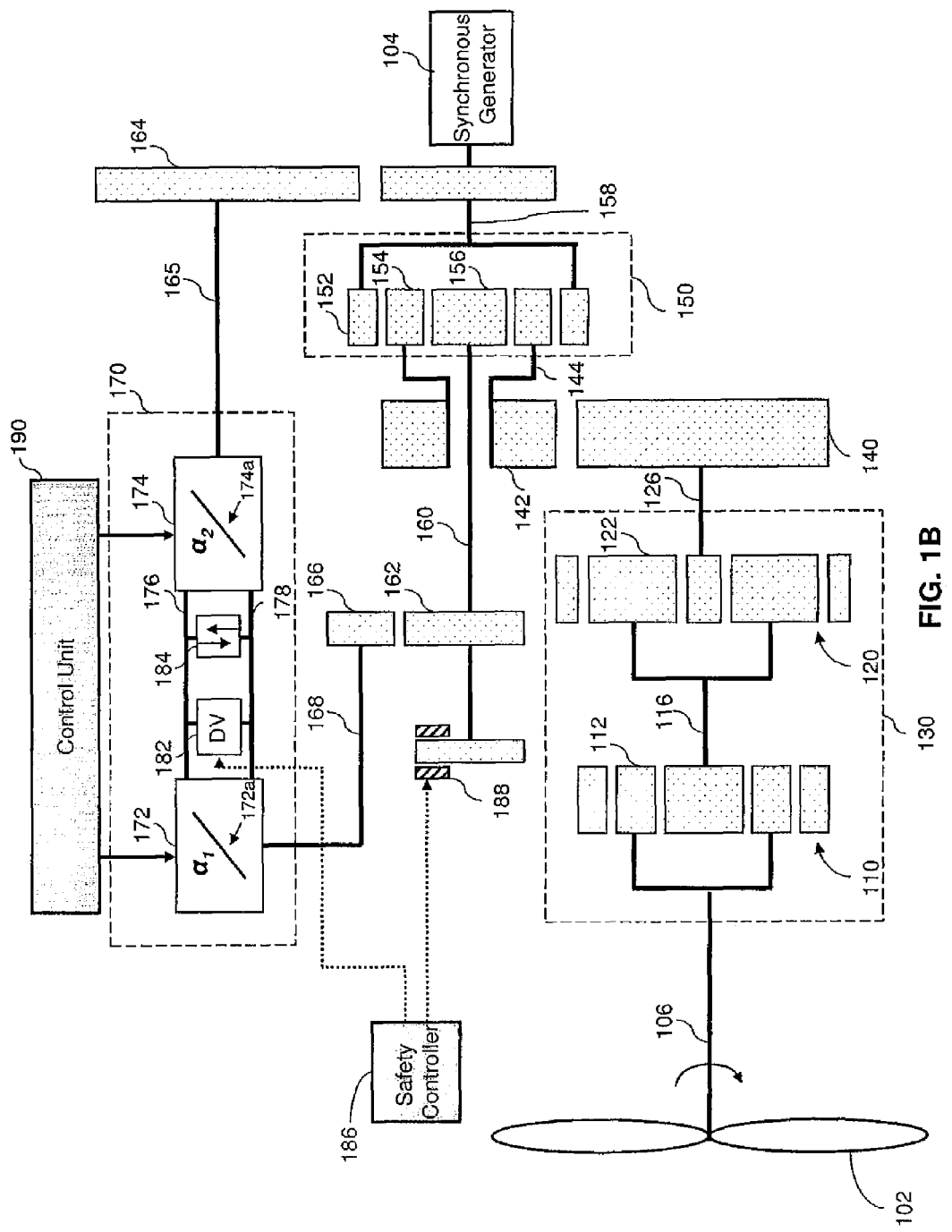

Referring to FIG. 1B, in a preferred embodiment, the rotor 102 is first connected through shaft 106 to a constant-ratio gear box 130. The gear box 130 is configured to transfer power from the low speed (high torque) input shaft 106 to a high speed (low torque) output shaft 126. In some examples, the gear box 130 includes a first and second epicyclic gears 110 and 120. Power at the input shaft 106 is transmitted, e.g., first to the planet carrier 112 of the first epicyclic gear 110, and then via a shaft 116 to the planet carrier 122 of the second epicyclic gear 120. Both epicyclic gears 110 and 120 are configured to give constant step-up ratios so that the speed of rotation gradually increases from, e.g., 15 RPM at the input shaft 106, to, e.g. 375 RPM at the low-torque output shaft 126 of the gear box 130. In some other examples, the gear box 130 may include additional or fewer gears configured in a different way to transmit power from low speed shaft 106 to high speed shaft 126.

The low-torque output shaft 126 drives a spur gear 140, which meshes with a pinion 142, and transmits power via a shaft 144 to a third epicyclic gear 150. The epicyclic gear 150 has three basic components, a planet carrier 154, an annulus 152, and a sun wheel 156. As described above, the planet carrier 154 receives input from shaft 144 and thus rotates at a speed proportional to the varying rotor speed. The annulus 152 is coupled to the generator 104 via a shaft 158, and rotates at the same speed as the generator 104. In this configuration, a constant generator speed is maintained by controlling the rotation of the sun wheel 156.

The sun wheel 156 is connected to an infinitely variable gear system 170 via a spur gear 162 and a pinion 166. In some examples, the infinitely variable gear 170 system includes a first and second hydraulic units 172 and 174 (e.g., hydraulic pumps/motors), interconnected by pressure lines 176 and 178.

The first hydraulic unit 172 controls the speed and direction of the rotation of sun wheel 156 via a shaft 168, pinion 166, spur gear 162, and shaft 160. Note that shaft 160 has no fixed transmission ratio either to the rotor 102 or to the generator 104, thereby acting as a variable speed control shaft. The second hydraulic unit 174 is coupled to the generator 104 via a shaft 165 and spur gear 164, and operates at a rotational speed proportional to the speed of the generator 104.

Preferably, both hydraulic units 174 and 172 have swash plates (symbolized in the figure) with controllable swivel angles (referred to herein as $\alpha_1$ and $\alpha_2$, respectively). The setting of swivel angles in the hydraulic units governs the direction and amount of power flow provided by the infinitely variable gear system 170 to the variable control speed shaft 160.

In this embodiment, a control unit 190 controls the swivel angles $\alpha_1$ and $\alpha_2$ so that a steady flow of power is transmitted to the generator even if local wind power fluctuates.

The control unit 190 may adopt various control strategies to set the swivel angles $\alpha_1$ and $\alpha_2$ to desirable positions. In general, the setting of swivel angles satisfies the continuity equation in the hydraulic circuit and provides a balanced hydraulic flow (i.e., equal volume flow rates in pressure lines 176 and 178). Preferably, the volume flow rates in the pressure lines are controlled to be sufficiently high, which then limits internal hydraulic pressures and possibly extends the lifetime of hydraulic units 172 and 174.

In some implementations, the swivel angle $\alpha_1$ in the first hydraulic unit 172 is determined based on rotor-speed-dependent characteristics. For example, the control unit 190 may use a pre-determined lookup table to select the value of $\alpha_1$ at a given rotor speed. The pre-determined lookup table lists desirable values of $\alpha_1$ as a function of rotor speed $\omega_{rotor}$, and is established e.g., by engineers during a testing phase.

In addition to controlling swivel angle $\alpha_1$, in some implementations, the control unit 190 sets the swivel angle $\alpha_2$ in the second hydraulic unit 174 based on an active torque control strategy.

Figure 2:
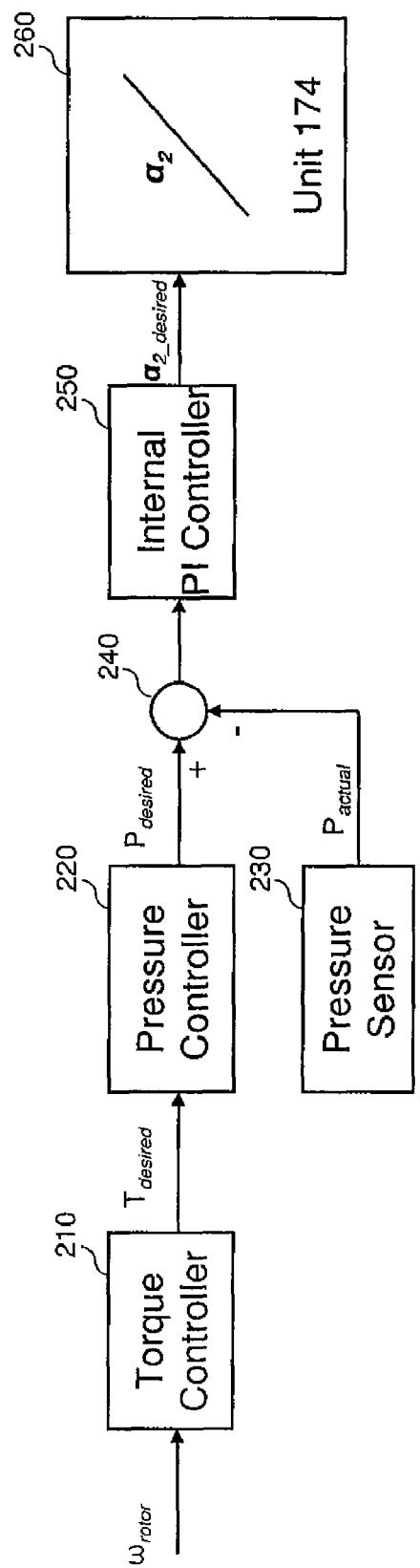
FIG. 2 is a block diagram of an exemplary implementation of the control unit in FIG. 1B.

For example, referring to FIG. 2, in order to maintain the generator speed at a prescribed level $\omega_{generator}$, the control unit 190 implements a torque controller 210, which determines the amount of torque $T_{desired}$ that is desired on shafts 168 and 165, respectively, based on an input of rotor speed $\omega_{rotor}$.

Based on $T_{desired}$, a pressure controller 220 determines a desired pressure $P_{desired}$ in the hydraulic circuit, again, for maintaining the rotation of the generator 104 at the constant speed $\omega_{generator}$. In this description, $P_{desired}$ generally refers to the desired pressure difference between pressure lines 176 and 178. This pressure difference is a primary driving force of the hydraulic flow in lines 176 and 178, affecting both the direction and volume rates of the hydraulic flow.

$P_{desired}$ is then compared with the actual pressure difference $P_{actural}$ between the hydraulic lines. $P_{actural}$ can be measured e.g., by one or multiple pressure sensors placed in the infinitely variable gear system 170. The error between $P_{actural}$ and $P_{desired}$, calculated by a summer 240, can be eliminated using an internal proportional integral (PI) controller 250. Meanwhile, the internal PI controller 250 calculates $\alpha_{2\_desired}$ and sets the swivel angle $\alpha_2$ in the hydraulic unit 174 to this desired position $\alpha_{2\_desired}$ so that the generator speed can be maintained at $\omega_{generator}$.

Referring again to FIG. 1B, at least three safety components, including a pressure relief valve 184, a switchable dump valve 182, and a brake 188, are implemented in the gear train 180 for gear protection. Each component is described further below.

The pressure relief valve 184 is placed between pressure lines 176 and 178. The pressure relief valve 184 limits the pressure in the hydraulic lines and thus protects the mechanical parts from overload and destruction, for example, by preventing the occurrence of exceedingly large torques within the gear.

The switchable dump valve 182 is also placed between the pressure lines. The switchable dump valve 182, if triggered, generates a hydraulic short circuit so that the pressure difference between two hydraulic conduits 176 and 178 is eliminated and the generator 104 is decoupled from the rotor 102.

The brake 188 is coupled to the variable speed control shaft 160. When triggered, the brake 188 stops the rotation of the variable speed control shaft 160 and thus the sun wheel 156. With a non-rotating sun wheel 156, the transmission ratio of the rotor 102 and the generator 104 is fixed by the mechanical coupling between the planet carrier 154 and annulus 152.

Each of these three safety components can operate alone, or in combination, in response to the occurrence of various error/fault conditions in the system.

For example, the pressure relief valve 184 is activated if, e.g., a system fault occurs when the swivel angle control of one or both hydraulic units 172 and 174 does not work properly due to communication failure or pump failure. For instance, the swivel angles may be blocked or may change rapidly into an undesirable position that causes unintended or unbalanced volume flow. Without the pressure relief valve 184, the pressure in one or two of the hydraulic lines 176 and 178 could increase rapidly and destroy several parts of the hydraulic system 170. The activation of pressure relief valve 184 limits the hydraulic pressure within a tolerable range, thereby avoiding damage to the hydraulic system.

The brake 188 is activated if the wind energy converter has to be stopped quickly due to certain system faults. Examples of such system faults include: 1) a sudden pressure drop in the hydraulic system due to a broken pipe, which is usually detected by pressure sensors in the hydraulic lines; 2) a communication error in the lines between a system programmable logical controller (PLC) and the control unit 190, which is detected e.g., by the PLC; and 3) fault in the hydraulic system that causes undesired and/or uncontrollable swivel angle positions of hydraulic units 172 and 174, which can be detected by swivel angle sensors in the hydraulics.

In some prior art systems, when a sudden pressure drop occurs, the generator 104 would be decoupled from the rotor 102. Although the rotor 102 stops in just a few seconds because of its large inertia, the generator 104 could continue to rotate for several minutes. As a result, the speed of one or both of the hydraulic units 172, 174 would become unsafely high and could potentially damage the hydraulic parts in the drive train.

In the current system, the activation of brake 188 immediately stops the rotation of the variable speed control shaft 160, which in turn causes the sun wheel 156 to stop. Because the transmission ratio of the rotor 102 and the generator 104 is fixed, the generator follows the rotor to a quick stop, without causing damage to the hydraulics.

Preferably, the dump valve 182 is triggered at the same time the brake is activated. By releasing pressure difference through a hydraulic short circuit, the dump valve 182 effectively avoids undesirable high pressure in the infinitely variable gear system 170.

In some applications, a safety controller 186 is implemented to control activation of brake 188 and switchable dump valve 182. In some examples, the safety controller 186 triggers the brake upon receiving a manual input from an operator. The safety controller 186 may also be configured to determine the occurrence of an error and initiate a safety event based on signals acquired by sensors placed at selected locations in the drive train 100.

In some applications, it may be desirable to adopt different swivel angle control strategies to protect the gears in the drive train 100. For example, when the wind energy converter is not in operation or in a non-synchronized state (e.g., during a system start-up or a slow stop), fixing swivel angles in both hydraulic units can be a simple and effective way to ensure safe operation. Depending on gear configuration, the fixed swivel angles can be selected based on a fixed rotor to generator transmission ratio that is desired during such a system state.

It is to be understood that the particular configuration of the drive train in FIGS. 1A, 1B and 2 is intended to illustrate and not to limit the scope of the invention. The invention can be applied to any variable rotor speed/constant generator speed drive train with a variable ratio gear system controlled by an infinitely variable gear, in particular by a hydrostatic circuit consisting of two hydraulic units connected by two pressure lines. The invention can also be applied to an infinitely variable gear system controlled by a hydrodynamic circuit (e.g., a VOITH system). More generally, the invention is applicable to any electric motor/generator systems that transmit power between a variable speed shaft and an output shaft in both directions. Other embodiments are within the scope of the following claims.

What is claimed is:

1. A variable ratio gear system configured for use with a constant speed generator being driven by a variable speed rotor, the variable ratio gear system comprising:
   a first shaft mechanically coupled to the rotor;
   a second shaft mechanically coupled to a variable gear system, the second shaft and the generator having a variable transmission ratio therebetween;
   a third shaft mechanically coupled to the generator and to the variable gear system;
   a control system that adjusts the output of the variable gear system to control the rotational speed of the generator; and
   an activatable brake that, upon activation, stops the rotation of the second shaft.

2. The variable ratio gear system of claim 1, wherein the control system adjusts the output of the variable gear system in response to fluctuation in the speed of the variable speed rotor, thereby causing constant power to be provided to the generator.

3. The variable ratio gear system of claim 1, wherein, upon activation of the brake, the generator continues to spin.

4. The variable ratio gear system of claim 1, wherein the variable gear system includes a hydraulic circuit having a first hydraulic unit mechanically coupled to the second shaft, and a second hydraulic unit mechanically coupled to the third shaft.

5. The variable ratio gear system of claim 4 wherein the control system determines desired configurations of the first and second hydraulic units on the basis of a prescribed generator speed.

6. The variable ratio gear system of claim 4 wherein the hydraulic circuit provides a hydraulic pressure, and the control system adjusts the output of the variable gear system on the basis of the hydraulic pressure.

7. The variable ratio gear system of claim 4 wherein the first and second hydraulic units are interconnected by hydraulic conduits.

8. The variable ratio gear system of claim 7, wherein the hydraulic conduits are interconnected by both a pressure relief valve and a dump valve that is separate from the pressure relief valve.

9. The variable ratio gear system of claim 7, wherein the hydraulic conduits are interconnected by a dump valve that causes a hydraulic short circuit between the conduits.

10. The variable ratio gear system of claim 1 further comprising a controller for controlling the brake.

11. The variable ratio gear system of claim 10, wherein the controller receives a manual input for activating the brake.

12. The variable ratio gear system of claim 10, wherein the controller receives sensor data and to determine the occurrence of an error based on received sensor data for activating the brake.

13. The variable ratio gear system of claim 1 further comprising a gear box mechanically coupled between the first shaft and the rotor.

14. The variable ratio gear system of claim 13 wherein the gear box includes a first epicyclic gear and a second epicyclic gear mechanically coupled to the first epicyclic gear, wherein each of the first and second epicyclic gears give a constant gear ratio.

15. The variable ratio gear system of claim 14 further comprising a spur gear mechanically coupled between the gear box and the first shaft.

16. The variable ratio gear system of claim 15 further comprising a spur gear mechanically coupled between the variable gear system and the second shaft.

17. The variable ratio gear system of claim 16 further comprising a spur gear mechanically coupled between the variable gear system and the third shaft.

18. The variable gear ratio system of claim 1 further comprising the variable gear system.

19. The variable gear ratio system of claim 18 wherein the variable gear system includes a hydraulic circuit.

20. The variable gear ratio system of claim 19 wherein the hydraulic circuit is a hydrostatic circuit.

21. The variable gear ratio system of claim 20 wherein the hydraulic circuit is a hydrodynamic circuit.

22. A variable ratio gear system configured for use with a constant speed generator being driven by a variable speed rotor, the variable ratio gear system comprising:
   an epicyclic gear;
   a first shaft mechanically coupling the rotor to the epicyclic gear for providing an input to the epicyclic gear;
   a second shaft mechanically coupled to the epicyclic gear;
   a third shaft that provides a direct mechanical coupling between the epicyclic gear and a generator;
   an infinitely variable gear system coupled to the epicyclic gear;
   a control system that adjusts the output of the infinitely-variable gear system to control the rotational speed of the generator; and
   an activatable brake that, upon activation, stops the rotation of the second shaft.

23. The variable ratio gear system of claim 22, wherein the epicyclic gear comprises:
   a first component that receives an input via the first shaft,
   a second component coupled to the second shaft, and
   a third component coupled to the generator via the third shaft, and
   wherein the infinitely variable gear system is coupled between the second and third component of the epicyclic gear.

24. A method for operating a variable ratio gear system with a constant speed generator being driven by a variable speed rotor, the variable ratio gear system having a first shaft mechanically coupled to the rotor, a second shaft mechanically coupled to a variable gear system, the second shaft having a variable transmission ratio to either the rotor or the generator, and a third shaft mechanically coupled to the generator and the variable gear system, the method comprising:
   adjusting the output of the variable gear system to control the rotational speed of the generator;
   determining whether a fault condition in the variable ratio gear system has occurred; and
   activating a brake, when a fault condition has occurred, to stop the rotation of the second shaft.

* * * * *